Aug. 22, 1939.  T. KESTENBAUM  2,170,720
MILK CAN CONSTRUCTION
Filed Dec. 28, 1937  2 Sheets-Sheet 1
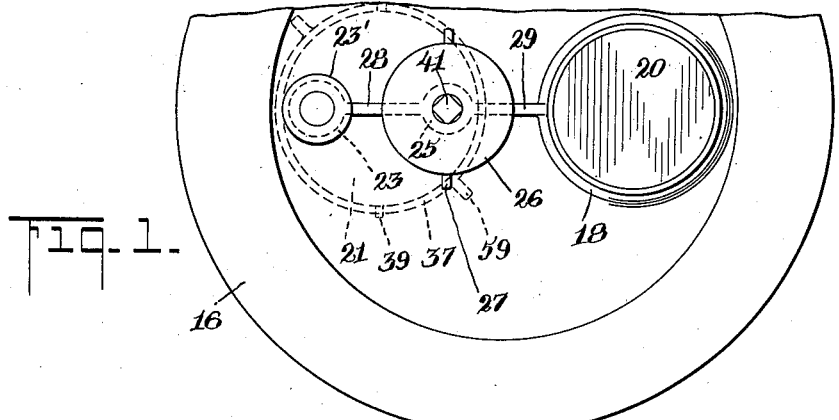
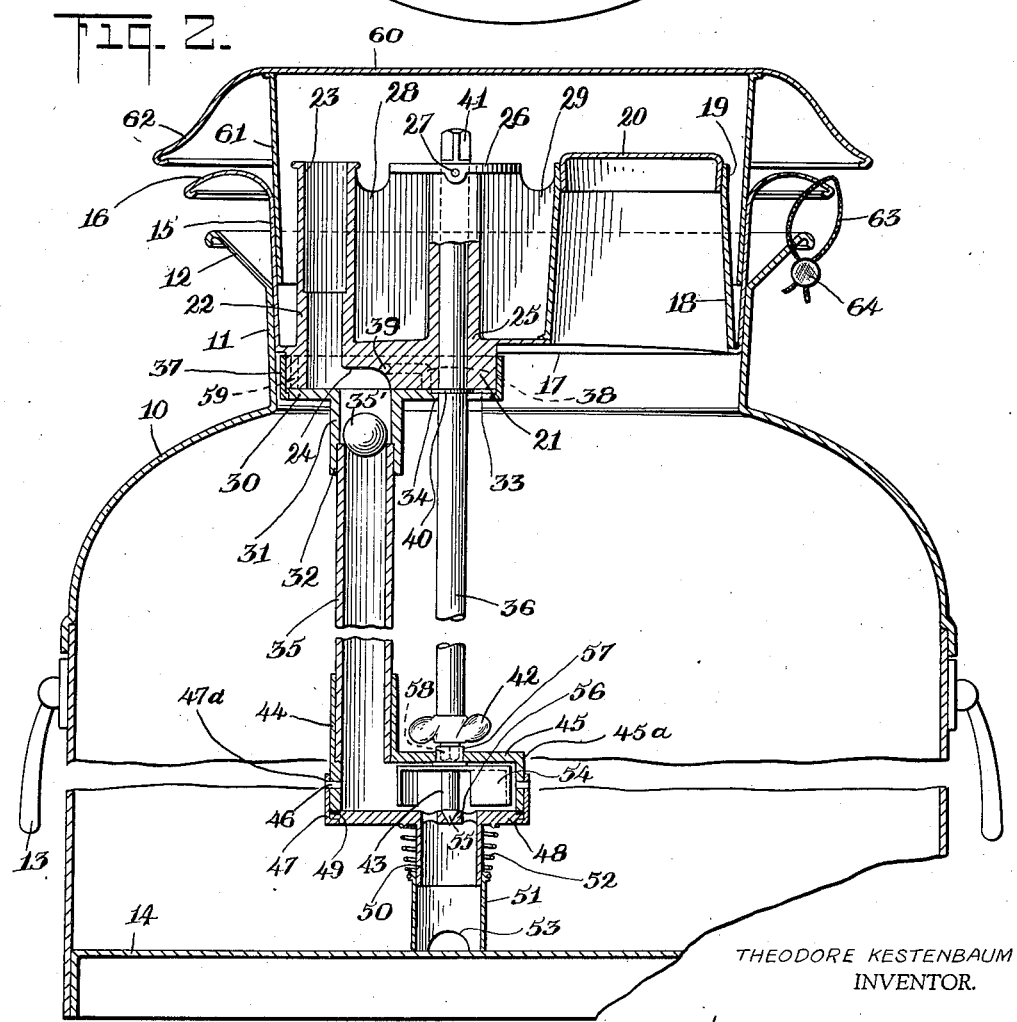
THEODORE KESTENBAUM
INVENTOR.
BY Alexander Mencher
ATTORNEY.

Aug. 22, 1939.   T. KESTENBAUM   2,170,720
MILK CAN CONSTRUCTION
Filed Dec. 28, 1937.   2 Sheets-Sheet 2
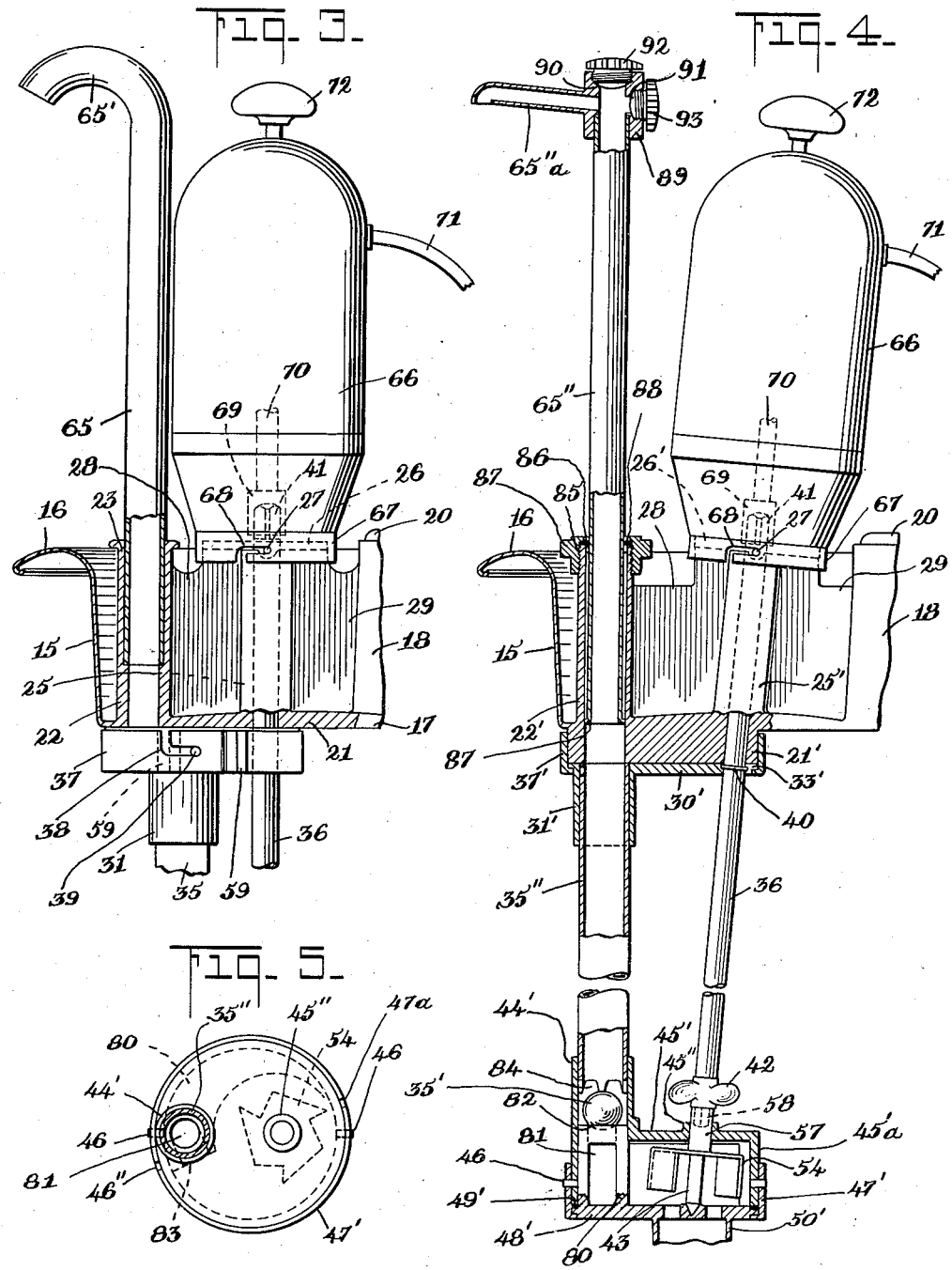
THEODORE KESTENBAUM
INVENTOR.
BY Alexander Bleucher
ATTORNEY.

Patented Aug. 22, 1939

2,170,720

UNITED STATES PATENT OFFICE 2,170,720

MILK CAN CONSTRUCTION

Theodore Kestenbaum, New York, N. Y.

Application December 28, 1937, Serial No. 182,142

9 Claims. (Cl. 221—67)

This invention relates generally to the construction of milk cans for the storing, transportation, dispensing and safeguarding against adulteration and unlawful tampering of loose milk. More specifically, the invention relates to a milk can having an agitator, a flow tube and a valve therefor all in association with an inner cover, the said parts being easily assembled and disassembled for sterilization purposes.

The main object of the invention is to provide a milk can construction for the storing, transportation and dispensing of loose milk in a sanitary manner and wherein means are provided for detecting and preventing adulteration of the milk when either in transit from the filling stations or on the premises of the retail dealer.

A further object of the invention resides in the construction of a milk can wherein hand operated stirrers, agitators, pumps or dippers are eliminated in the sale of loose milk from milk can containers, and wherein the several parts and assembly of parts of the milk can construction are easily dismantled and reassembled for purposes of sterilization.

Another object of the invention is the provision of a construction above outlined wherein the ultimate consumer is certain that the milk in the container is properly agitated, is free from contamination from both the inside and outside, and contains the contents and purity of ingredients prescribed by law.

These objects and other incidental ends and advantages of the invention will hereinafter appear in the progress of the disclosure and as pointed out in the appended claims.

Accompanying this specification are drawings showing preferred forms of the invention wherein corresponding reference characters designate corresponding parts throughout the several views and wherein:

Figure 1 is a partial top plan view of the milk can with the conventional outer cover removed, showing the inner cover.

Figure 2 is a diametrical sectional view of the milk can having the outer cover in closed position, the said view being vertically foreshortened.

Figure 3 is a front view in elevation partly in section particularly showing the motor and dispensing tube in position for the dispensing of milk.

Figure 4 is a view similar to Figure 3 showing a collapsible discharge nozzle and accompanying construction and accompanied by supporting construction including valve mechanism.

Figure 5 is a plan view of the housing for the impeller blade and the check valve therein being shown partially in section.

In accordance with the invention and in accordance with the preferred forms thereof shown in the drawings, the can construction comprises a body member, a removable inner cover therefor, a flow tube and agitator shaft removably engageable with the said inner cover, an impeller blade mounted on said agitator shaft and being mounted within a housing partially detachable from the flow tube. The detachable shaft is actuated by a removably engageable motor supported on the upper surface of the inner cover. When the shaft is in rotating condition, fluid such as milk in the can or body is forced up the flow tube by means of the impeller in the housing and tapped from the flow tube by means of a discharge nozzle.

Referring more specifically to the construction of the preferred forms of the invention shown in the drawings, numeral 10 designates the conventional milk can body having a tapered neck 11, an upper peripheral flange 12, handles 13 and a bottom wall 14. Adapted to be removably engaged within neck 11 is an inner cover member 15 having its side walls tapered to engage the tapered neck 11, the said inner cover member also being provided with a peripheral flange 16, the bottom wall of the said inner cover being designated by numeral 17.

The inner cover member is provided with a feeding chamber 18 projecting above bottom wall 17 thereof and communicating with the interior of body 10. The upper wall portions 19 of chamber 18 are inwardly tapered to accommodate a cap member 20, the latter having side walls with a taper corresponding to 19 for engagement therewith. Cap member 20 is rounded on top thereby making it impossible to pry the same from chamber 18 on the outside thereof.

The bottom wall 17 of the inner cover member 15 is provided with a boss member 21 having cylindrical walls extending downwardly from bottom 17 and a flat undersurface, the said boss 21 being provided with an upwardly extending tubular standard 22 on one side and an upwardly extending tubular bearing 25 on the other side, the bores of said members 22 and 25 penetrating the thickness of boss 21. The tubular standard 22 is adapted to receive a discharge tube 65 while bearing 25 is adapted to receive an agitator shaft 36 as will hereinafter more fully appear. The standard 25 is surmounted by a circular disc member 26 whose plane is coextensive preferably with the upper surface of 22 at the enlarged and communicating portion 23. The standard 22 and portion 23 thereof are joined to shaft bearing 25 by means of a web 28 while web 29 joins shaft bearing 25 to the walls of the feeding chamber 18. The circular disc 26 is provided with diametrically disposed pins 27 for affixation thereto of a motor 66 hereinafter to be described.

Boss 21 on the undersurface thereof is provided with a transverse depression 24 communicating with the bore of the discharge tube standard 22. A plate member 30 is adapted to abut the undersurface of boss 21 and to be removably engageable therewith. Plate member 30 has a central depending tubular section 31 communicating with the transverse depression 24 of boss 21 and an orifice 34 communicating with the bore of shaft bearing 25, the said orifice 34 continuing laterally to form a notch 33 whereby agitator shaft 36 becomes engageable laterally with orifice 34. The upper end of orifice 34 and a portion of notch 33 are provided with shoulder portions to engage flange 40 of shaft 36 to prevent vertical displacement of said shaft 36 as will more fully be described.

Secured to tubular section 31 is a depending flow tube 35 while agitator shaft 36 penetrates orifice 34 of plate member 30 and the shaft bearing 25, the upper end of agitator shaft 36 terminating above disc plate 26 in a nut-like cap 41. The flange 40 on shaft 36 is situated between the lower surface of boss 21 and plate member 30 and serves to maintain shaft 36 in a vertically non-displaceable position.

A valve 35', preferably in the form of a ball bearing is seated on the upper surface of flow tube 35 within tubular section 31, the said valve 35' being adapted to permit the flow of liquid upwardly from tube 35, but to prevent the flow of liquid downwardly from standard 22 and depression 24.

Plate member 30 is removably engageable with boss 21 by virtue of a securing ring 37 having bayonet slots 38 which engage diametrically disposed pins 39 situated on the walls of boss 21. Moreover, the securing ring 37 is provided with opposing hand lugs 59 by which the said ring member is affixed to boss 21 by engagement of pins 39 with bayonet slots 38, thereby causing engagement of plate member 30 to the said boss. The lugs 59 are so disposed on the ring member that once the ring member engages the boss 21, one of the lugs 59 abuts against the internal side of the can or body member 10 as shown in Figure 1. In this manner, ring member 37 cannot be loosened from boss 21 by vibration caused either by transportation or the operation of the motor 66. In order to assemble or disassemble plate member 30 relative to boss 21, ring member 37 is manipulated while the inner cover 15 is off can 10.

The agitator shaft 36 at the lower portion thereof is provided with an agitator blade 42, the shaft terminating in a nut 58. The mechanism transferring motion from the shaft 36 to an impeller assembly comprises a housing 44 having upper and side walls 45 and 45a respectively, the said housing being affixed to and communicating with flow tube 35. A bottom wall 48 is removably engaged to the side walls 45a at the lower edges thereof at packing 49, the said bottom wall 48 being secured to the housing by means of a binding ring 47 having a lower inwardly turned flange, the said binding ring 47 being provided with the usual bayonet slots 47a to engage pins 46 on side walls 45a of the housing. A socket 57 is provided to engage nut 58, the said socket penetrating an orifice in the upper wall 45 of the housing and is provided at the lower part with a spindle 43 having an impeller blade 54 keyed thereto. That portion of socket 57 abutting the inner surface of the upper wall 45 of the housing is provided with a shoulder to prevent upward displacement of spindle 43 and impeller blade 54 both within the housing and secured to the said socket. The socket 57 externally of the housing engages nut 58 thereby transferring motion from shaft 36 to the impeller blade 54. The bottom wall 48 of the housing is provided with a conical seat 56 to accommodate the tapered end portion 55 of spindle 43, the said seat acting as a bearing for said spindle 43.

The bottom wall 48 of housing 44 is provided with a depending tube 50 communicating with the housing, the said tube 50 being secured to and communicating with an auxiliary lower tube 51 having an opening 53 at the bottom thereof, the tube 51 being forced to the bottom of the can 10 by means of a coil spring 52 situated between the upper surface of auxiliary tube 51 and the lower surface of bottom wall 48 of the housing so that tube 51 accommodates itself to the depth 14 of milk can or body 10.

The inner cover 15 is provided with the conventional milk can outer cover 60, has a tapered neck 61 to engage with the tapered neck of inner cover 15 and is also provided with the conventional flange 62. Means are provided to detect the removal of the inner cover 15 from the neck 11 of can 10 by any means such as a cord or wire penetrating through flanges 16 of the inner cover and 12 of body 10. The ends of cord or wire 63 are connected to a seal 64 which can detect tampering or opening of the inner cover from body 10.

Numeral 65 represents a discharge nozzle which is adapted to engage standard 22 at 23, the said discharge nozzle having a discharge end 65'. A motor 66 is provided with a securing band 67 having bayonet slots 68 therein to engage pins 27 secured on disc 26. The motor 66 is provided with a drive shaft 70 having at the lower portion thereof a socket 69 to engage the nut-like terminal 41 of the agitator shaft 36. 71 represents electrical connections of motor 66 while 72 represents the switching means for the motor.

The above description includes the construction of a milk can as shown in Figures 1, 2 and 3. It is to be noted that the milk can construction, assembled as in Figure 2, is in condition to be used either for the dispensing of milk or for the transportation thereof. Assuming that the can 10 has already been filled with milk at the filling station, the retail dealer after he has received the can, first removes the outer cover 60. Thereafter he inserts discharge tube 65 within standard 22 at 23 and connects motor 66 to disc 26 so that socket 69 engages nut-like terminal 41. By turning a switch 72, the movement of agitator shaft 36 causes agitation of the milk by means of blade 42 while the impeller 54 within housing 44 creates an upward suction causing the contents of can 10 to flow upwardly through opening 53, tube 51, tube 52, housing 44, through flow tube 35, tubular section 24, standard 22, 23 and then into discharge nozzle 65. During this process, the valve 35' is lifted above its seat on channel 35. When the desired quantity of milk has been taken from the can 10, the switch 72 of the motor is turned off.

The construction above described has been designed with a specific end in view. This end solves the problem of the construction of milk containers which deliver milk either automatically or with the least number of manual operations, and the parts of which are easily assembled and disassembled whereby all surfaces are penetrable to sterilization.

By removing ring member 47 from housing 44, the bottom member 48 of the housing becomes detachable while the impeller blade 54 and spindle 43, both secured to socket 57, are detachable from nut 58 on shaft 36. By removing securing ring 37 from boss 21, the plate 30 is freed from 21 and also from shaft 36 by virtue of notch 33 in the upper surface thereof. Moreover, after plate 30 is removed from boss 21, the shaft 36 is directly withdrawable from shaft bearing 25 in the inner cover member. It is also to be observed that when plate 30 is removed from boss 21, the ball bearing valve 35' is exposed. Sterilization of the can before being filled thus can penetrate all the parts in disassembled position. After the parts have been assembled, however, further sterilization can be effected through the opening of feeding chamber 18 or standard 22. Following sterilization of the milk can container, the milk at the filling station is poured in the feed chamber 18 and thereafter cap 20 is secured thereover. Said cap cannot be removed by external tampering since the upper edge is rounded and no grip can be obtained. The only way to remove cap 20 is to force it open at the filling station by first removing inner cover member 15 and then applying force through the feed chamber 18.

Figures 4 and 5 show a construction similar to the construction shown in Figures 2 and 3 except that the discharge nozzle is collapsible so that the storekeeper need not bother with the insertion of a discharge nozzle and thereby suffer or be obliged with the burden of providing a sanitary discharge tube. In order that the collapsible discharge nozzle be substituted for the one shown in the first form of the invention, it has been found necessary to mount motor 66 at an incline, since the width of the inner cover member 15 cannot be varied and since the manufacturer is limited to standard sizes in the milk can containers.

Thus, motor 66 is mounted on disc 26' which is disposed at an angle while the shaft 36 has a bearing 25' situated at an angle to and proceeding from and above boss 21'. Moreover, agitator shaft 36 penetrates housing 44' at an angle through opening 45'' in the upper wall 45', the said housing being provided with side walls 45'a. Boss 21' similarly secured to the inner cover member 15 as in the first form of the invention, is provided with a flow tube standard 22' which accommodates the discharge tube 65''.

Boss 21' is provided with plate member 30' and a depending tubular section 31' into which the upper part of flow tube 35'' is secured. 37' is a ring member securing plate 30' to boss 21' in similar fashion as in the first form of the invention.

The housing 44' is provided with a detachable bottom wall 48' having a bearing for spindle 43 and a communicating tube 50' to the interior of can 10, the said housing 44' being communicatively secured to the lower end of flow tube 35''. The upper surface of bottom wall 38' has a spirally disposed lug 80 having a bore 81 communicating with the interior of housing 44' at the bottom and terminating at the top in a seat 82 communicating with flow tube 35'', on which seat rests a valve 35'. The upwardly extending tubular portion of housing 44' is notched as indicated by numeral 84 as shown in Figure 4, whereby fluid is permitted to proceed upwardly along flow tube 35'' when the valve 35' is forced upwardly above seat 82.

The discharge nozzle 65'' is adapted to be in sliding relation with the flow tube 35'' and whereby portion 65''a may be forced downwardly along flow tube 35'' to permit the outer cover 60 to cover the same. The flow tube 35'' at the upper end is externally threaded as shown at 85 and is also provided with a flange 86 which engages an outwardly turned flange 87 at the lower end of flow tube 65'', thereby preventing the flow tube 65'' from being entirely withdrawn from standard 22' while a cap member 87 engages with the threaded portion 85 of standard 22'. A gasket 88 is interposed between the upper surface of standard 22' and the inner upper surface of cap 87.

The dispensing portion 65''a is communicatively secured to the upper end of nozzle 65'' by means of a block 89 having two concave recesses 90 and 91 which recesses are engaged by caps 92 and 93 in fluid tight relation with the said seats. When caps 92 and 93 are removed, ingress may be made to the flow tube 65''.

It is to be observed that the standard 22 above upper surface of portion 23 is provided with a snap cap 23' as shown in Figure 1, in order to maintain the interior of can 10 free from outside contamination. When the retailer is ready to insert discharge nozzle 75 into 23, the said cap 23' is removed.

I wish it understood that minor changes and variations in the two preferred forms of the invention above described, in respect to integration of parts, location, material, assembly and detachability of parts, may all be resorted to without departing from the spirit of the invention and without departing from the scope of the appended claims and that the container above described may be used for other edible liquids besides milk.

I claim:

1. In a can construction including a body member, a removable cover engageable therewith, a feeding channel, a discharge tube and a shaft bearing all carried by the said cover, a pump mechanism including a flow tube within the body member and having a valve therein, the flow tube being adapted to communicate with the said discharge tube and a rotatable shaft adapted to penetrate the said shaft bearing, means at the undersurface of the removable cover to detachably engage said flow tube and shaft to said cover.

2. In a can construction as set forth in claim 1 wherein an outer cover is detachably engagable with the removable cover.

3. In a can construction including a body member, a removable cover engagable therewith, a feeding channel, a discharge tube and a shaft bearing all carried by the said cover, a pump mechanism including a flow tube within the body member, the flow tube being adapted to communicate with the said discharge tube and a rotatable shaft adapted to penetrate the said shaft bearing, mounting means on top of the shaft bearing, power means secured on said mounting means to actuate said rotatable shaft, means at the undersurface of the removable cover to detachably engage said flow tube and shaft to said cover.

4. In a can construction as set forth in claim 3 wherein the flow tube is provided with a check valve.

5. In a can construction as set forth in claim 3 wherein an outer cover is detachably engagable with the removable cover.

6. In a can construction including a body member, a removable cover engagable therewith, a discharge tube and a shaft bearing, both carried by the said cover, a pump mechanism including a flow tube within the body member, the flow tube being adapted to communicate with the said discharge tube, a rotatable shaft adapted to penetrate the said shaft bearing, means at the undersurface of the removable cover to detachably engage said flow tube and shaft to said cover.

7. In a can construction including a body member, a removable cover engagable therewith, a discharge tube and shaft bearing both carried by the said cover, a pump mechanism including a flow tube within the body member and having a valve therein, the flow tube being adapted to communicate with the said discharge tube and a rotatable shaft adapted to penetrate the said shaft bearing, means at the undersurface of the removable cover to detachably engage said flow tube and shaft to said cover.

8. In a can construction as set forth in claim 6 wherein an outer cover is detachably engagable with the removable cover.

9. In a can construction as set forth in claim 7 wherein an outer cover is detachably engagable with the removable cover.

THEODORE KESTENBAUM.